United States Patent
Ananthapur Bache et al.

(10) Patent No.: US 10,579,807 B2
(45) Date of Patent: Mar. 3, 2020

(54) PREVENTING IMAGE CAPTURE DATA LEAKS

(71) Applicant: International Business Machines Corporation, Armonk, NY (US)

(72) Inventors: Vijay Kumar Ananthapur Bache, Bangalore (IN); Vijay Ekambaram, Chennai (IN); Saravanan Sadacharam, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 15/422,542

(22) Filed: Feb. 2, 2017

(65) Prior Publication Data
US 2018/0218163 A1    Aug. 2, 2018

(51) Int. Cl.
*G06F 21/62* (2013.01)

(52) U.S. Cl.
CPC .................. *G06F 21/6209* (2013.01)

(58) Field of Classification Search
CPC .................................................. G06F 21/6209
See application file for complete search history.

(56) References Cited

U.S. PATENT DOCUMENTS

| | | | |
|---|---|---|---|
| 9,377,991 B1 * | 6/2016 | Rapport | G06F 3/165 |
| 9,898,619 B1 * | 2/2018 | Hadsall | G06F 21/6245 |
| 2011/0154219 A1 * | 6/2011 | Khalatian | G06F 3/1462 |
| | | | 715/751 |
| 2012/0036452 A1 * | 2/2012 | Coleman | G06F 21/55 |
| | | | 715/751 |
| 2012/0047203 A1 * | 2/2012 | Brown | G06Q 30/02 |
| | | | 709/203 |
| 2013/0117392 A1 * | 5/2013 | Aceves | H04L 51/30 |
| | | | 709/206 |
| 2013/0283061 A1 * | 10/2013 | Jeong | G06F 21/602 |
| | | | 713/189 |
| 2014/0215356 A1 | 7/2014 | Brander et al. | |
| 2015/0163182 A1 | 6/2015 | Chandrasekaran | |
| 2015/0332439 A1 * | 11/2015 | Zhang | G06T 5/002 |
| | | | 345/647 |
| 2016/0171242 A1 * | 6/2016 | Basavapatna | H04L 51/12 |
| | | | 726/27 |
| 2017/0041259 A1 * | 2/2017 | Tao | H04W 4/12 |

(Continued)

FOREIGN PATENT DOCUMENTS

CN    102004878 A    4/2011

OTHER PUBLICATIONS

"Screenpresso", retrieved from https://www.screenpresso.com/; as early as Dec. 2009.

(Continued)

*Primary Examiner* — Jason Chiang
(74) *Attorney, Agent, or Firm* — Brown & Michaels, PC; Nicholas Bowman (57) ABSTRACT

When a first device computer is placed in privacy aware mode, specific events are monitored for, and a program can instantaneously blur or mask data being displayed on a screen of a second device computer. Therefore, if a snapshot is triggered, contents of the snapshot are blurred or masked, such that the contents are not recognizable or readable by another user or by a receiver. The contents of the snapshot which are blurred or masked preferably include only confidential information.

18 Claims, 4 Drawing Sheets

(56) References Cited

U.S. PATENT DOCUMENTS

| | | | |
|---|---|---|---|
| 2017/0104893 A1* | 4/2017 | Hardy | G06F 21/629 |
| 2017/0186127 A1* | 6/2017 | Yu | G06F 3/04845 |
| 2018/0027019 A1* | 1/2018 | Ligman | H04L 63/20 |
| | | | 726/1 |

OTHER PUBLICATIONS

"How to blocking Screen Capture", retrieved from https://community.mcafee.com/thread/73011?tstart=0; Sep. 2014.

"Programmatically taking a screenshot of your app in iOS", retrieved from https://tiffanyb.net/2011/04/05/programmatically-taking-a-screenshot-of-your-app-in-ios/; Apr. 2011.

"Screen Capture on Multiple Monitors", retrieved from https://www.codeproject.com/articles/546006/screen-capture-on-multiple-monitors; as early as Feb. 2013.

"C++Direct3D Multiple Screen Capture", retrieved from http://stackoverflow.com/questions/25681915/c-direct3d-multiple-screen-capture; as early as Mar. 2015.

Krause, A. "Use Snagit to Blur Out Sections of a Screenshot", retrieved from https://www.groovypost.com/howto/blur-screenshot-text-snagit/; Jul. 2016.

Melamed, T. "iOS: I just snapshotted your credit card . . . I did it for you!", retrieved from https://appsec-labs.com/portal/ios-i-just-snapshotted-your-credit-card-i-did-it-for-you/; Jul. 2015.

"Controlling the screenshot in the iOS 7 multitasking switcher", retrieved from http://stackoverflow.com/questions/18959411/controlling-the-screenshot-in-the-ios-7-multitasking-switcher; as early as Dec. 2013.

'How can I find out if someone took a screenshot of my Snapchat conversation illegally?, retrieved from https://www.quora.com/How-can-I-find-out-if-someone-took-a-screenshot-of-my-Snapchat-conversation-illegally; Oct. 2016.

Rafael Oliveira "Multiple Monitors Screen Capture", retrieved from http://www.mathworks.com/matlabcentral/fileexchange/34960-multiple-monitors-screen-capture?requestedDomain=www.mathworks.com Feb. 2012.

* cited by examiner

PREVENTING IMAGE CAPTURE DATA LEAKS

BACKGROUND

The present invention relates to image capture of information, and more specifically to preventing image capture of information data leakage.

It is a common practice for users to capture information currently being viewed on a screen of a device by using image capturing software of the device to store the information as an image. This may be referred to as a "snapshot". Users use snapshots to store evidence or records they may need to reference at a later time. The information captured can be confidential or non-confidential in nature. When the snapshot includes confidential information, which is stored on the user's device, there is a possibility of a breach of privacy of the confidential data present within the image of the snapshot stored on the device. Snapshots may be taken programmatically.

SUMMARY

According to an embodiment of the present invention, a method of preventing snapshot data leaks of data confidential to a first user sent from a first device computer of the first user to a second device computer through an application in a privacy mode and displayed on a screen of the second device computer through an application is disclosed. The method comprising the steps of: the first device computer monitoring for snapshots triggered on the second device computer through the application on the second device computer displaying the data confidential to the first user and when a snapshot is triggered on the second device computer, the first device computer: notifying the applications in privacy mode; analyzing existing rendered contents on the screen in the application of the second device computer in privacy mode as confidential or non-confidential; and masking the confidential information on the screen in the application of the second device computer in privacy mode and masking the confidential information present within the snapshot triggered on the second device computer.

According to another embodiment of the present invention, a computer program product for preventing snapshot data leaks of data confidential to a first user sent from a first device computer of the first user to a second device computer through an application in a privacy mode and displayed on a screen of the second device computer through an application is disclosed. The first device computer and the second device computer comprising at least one processor, one or more memories, one or more computer readable storage media, the computer program product comprising a computer readable storage medium having program instructions embodied therewith, the program instructions executable by the computer to perform a method comprising: monitoring, by the first device computer, for snapshots triggered on the second device computer through the application on the second device computer displaying the data confidential to the first user and when a snapshot is triggered on the second device computer: notifying, by the first device computer, the applications in privacy mode; analyzing, by the first device computer, existing rendered contents on the screen in the application of the second device computer in privacy mode as confidential or non-confidential; and masking, by the first device computer, the confidential information on the screen in the application of the second device computer in privacy mode and masking, by the first device computer, the confidential information present within the snapshot triggered on the second device computer.

According to another embodiment of the present invention, a computer system for preventing snapshot data leaks of data confidential to a first user sent from a first device computer of the first user to a second device computer through an application in a privacy mode and displayed on a screen of the second device computer through an application is disclosed. The computer system comprising at least a first device computer and a second device computer, the first device computer and the second device computer each comprising at least one processor, one or more memories, one or more computer readable storage media having program instructions executable by the computer to perform the program instructions. The program instructions comprising: monitoring, by the first device computer, for snapshots triggered on the second device computer through the application on the second device computer displaying the data confidential to the first user and when a snapshot is triggered on the second device computer: notifying, by the first device computer, the applications in privacy mode; analyzing, by the first device computer, existing rendered contents on the screen in the application of the second device computer in privacy mode as confidential or non-confidential; and masking, by the first device computer, the confidential information on the screen in the application of the second device computer in privacy mode and masking, by the first device computer, the confidential information present within the snapshot triggered on the second device computer.

DETAILED DESCRIPTION

It is recognized that since snapshots may be taken programmatically on a device, and software may be used to transmit the snapshot of the data captured to a server computer for access by an unauthorized user.

In an embodiment of the present invention, a user controls snapshot prevention on a device for specific applications or programs of the device through the application. The user may provide input regarding what, if any, data of a snapshot can be copied or viewable once the snapshot has been transmitted to a receiver and the receiver's associated device, allowing the owner of the data to control the data of the snapshot at the receiving end.

In an embodiment of the present invention, applications or programs on a first device computer of the user register snapshot interrupt actions (i.e. print screen press, snapshot short-cut keys, API/System Call interrupts) when the user's first device computer or any associated applications have been placed in privacy aware mode. Privacy aware mode is a mode on the device in which specific files or data is marked or designated as not being accessible to a user other than the owner without providing specific authentication. Applications of the device may also be placed into privacy aware mode.

When the first device computer is placed in privacy aware mode, specific events are monitored for, and a program can instantaneously blur or mask data being displayed on a screen of a second device computer. Therefore, if a snapshot is triggered, contents of the snapshot are blurred or masked, such that the contents are not recognizable or readable by another user or by a receiver. The contents of the snapshot which are blurred or masked preferably include confidential information only. The information designated as confidential may be determined by the user providing the information. It should be noted that information designated as confidential can vary between users.

Figure 1:
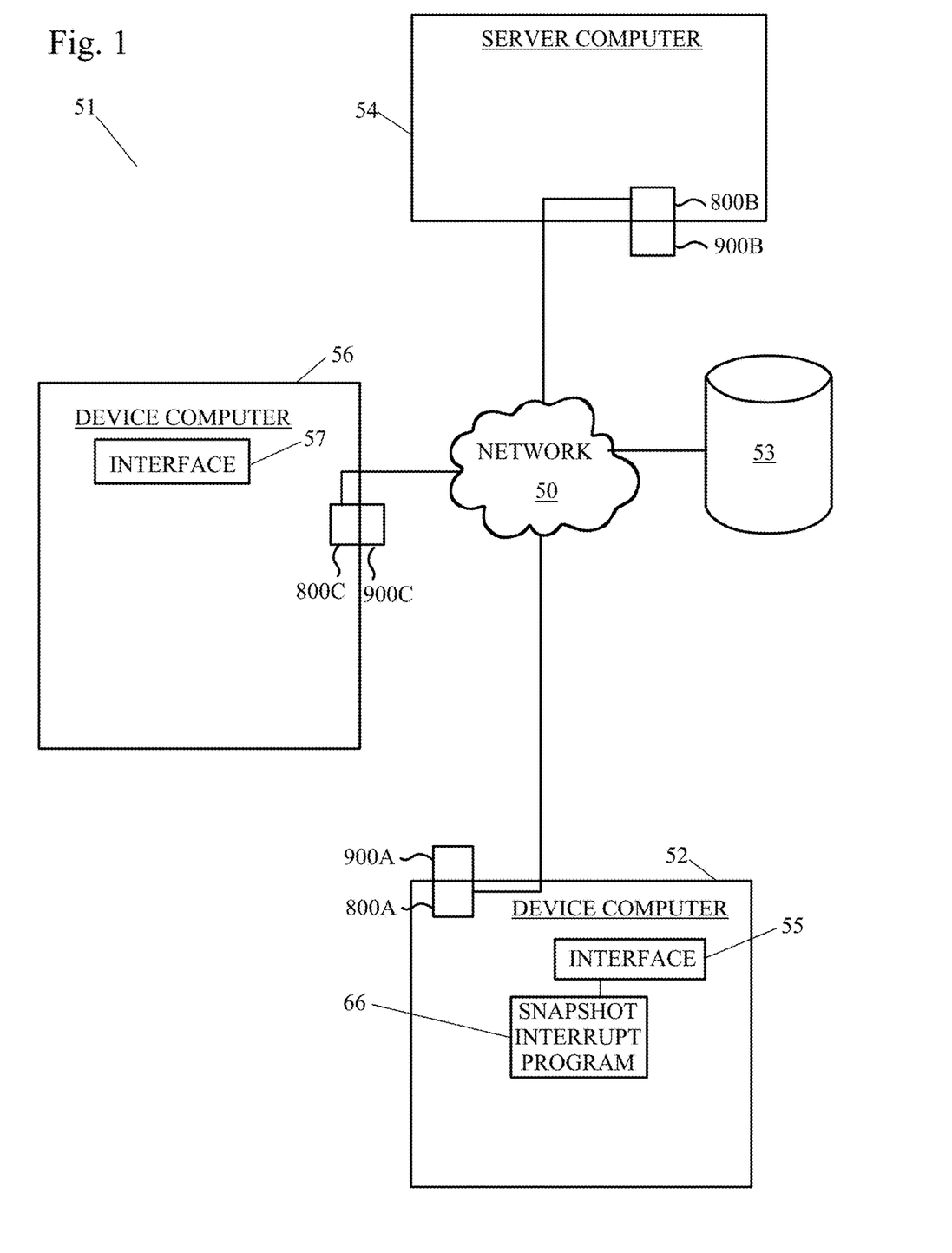
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, a first device computer 52, a second device computer 56, a repository 53, and a server computer 54 connect to network 50. In other exemplary embodiments, network data processing system 51 may include additional client or device computers, storage devices or repositories, server computers, and other devices not shown.

The first device computer 52 may contain an interface 55, which may accept commands and data entry from a user. The commands may be regarding an activation or inactivation of a privacy aware mode of an application of the device. The commands may also be regarding what content should be tagged as confidential. The interface can be, for example, a command line interface, a graphical user interface (GUI), a natural user interface (NUI) or a touch user interface (TUI). The first device computer 52 preferably includes a snapshot interrupt program 66. The first device computer may be a mobile device, smartphone, tablet or other device with a screen. While not shown, it may be desirable to have the snapshot interrupt program 66 be present on the server computer 54. The first device computer 52 includes a set of internal components 800a and a set of external components 900a, further illustrated in FIG. 4.

The second device computer 56 may contain an interface 57, which may accept commands and data entry from a user. The commands may be regarding an initiation of data capture of information on the screen of the device (i.e. snapshot). The interface can be, for example, a command line interface, a graphical user interface (GUI), a natural user interface (NUI) or a touch user interface (TUI). The device computer may be a mobile device, smartphone, tablet or other device with a screen 64. The second device computer 56 includes a set of internal components 800c and a set of external components 900c, further illustrated in FIG. 4.

Figure 4:
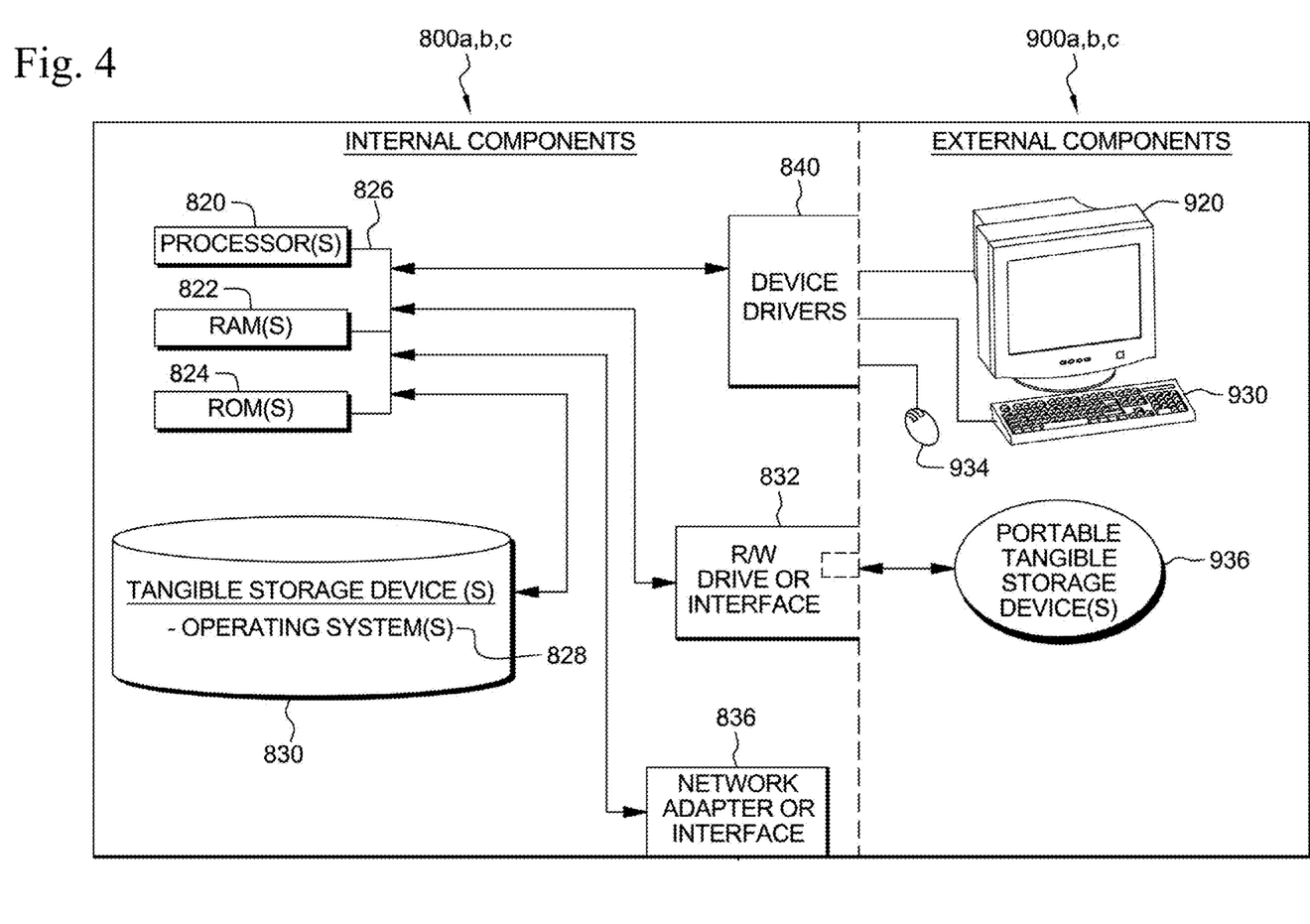
FIG. 4 illustrates internal and external components of a client computer and a server computer in which illustrative embodiments may be implemented.

Server computer 54 includes a set of internal components 800b and a set of external components 900b illustrated in FIG. 4. In the depicted example, server computer 54 provides information, such as boot files, operating system images, and applications to the first device computer 52 and the second device computer 56. Server computer 54 can compute the information locally or extract the information from other computers on network 50. The server computer 54 may contain the snapshot interrupt program 66.

Program code and programs such as snapshot interrupt program 66 may be stored on at least one of one or more computer-readable tangible storage devices 830 shown in FIG. 4, on at least one of one or more portable computer-readable tangible storage devices 936 as shown in FIG. 4, or on storage unit 53 connected to network 50, or may be downloaded to a first device computer 52, a second device computer 56 or server computer 54, for use. For example, program code and programs such as snapshot interrupt program 66 may be stored on at least one of one or more storage devices 830 on server computer 54 and downloaded to first device computer 52 or a second device computer 56 over network 50 for use. Alternatively, server computer 54 can be a web server, and the program code, and programs such as snapshot interrupt program 66 may be stored on at least one of the one or more storage devices 830 on server computer 54 and accessed by the first device computer 52 and/or the second device computer 56. In other exemplary embodiments, the program code, and programs such as snapshot interrupt program 66 may be stored on at least one of one or more computer-readable storage devices 830 on first device computer 52, second device computer 56, or distributed between two or more servers.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

Figure 2:
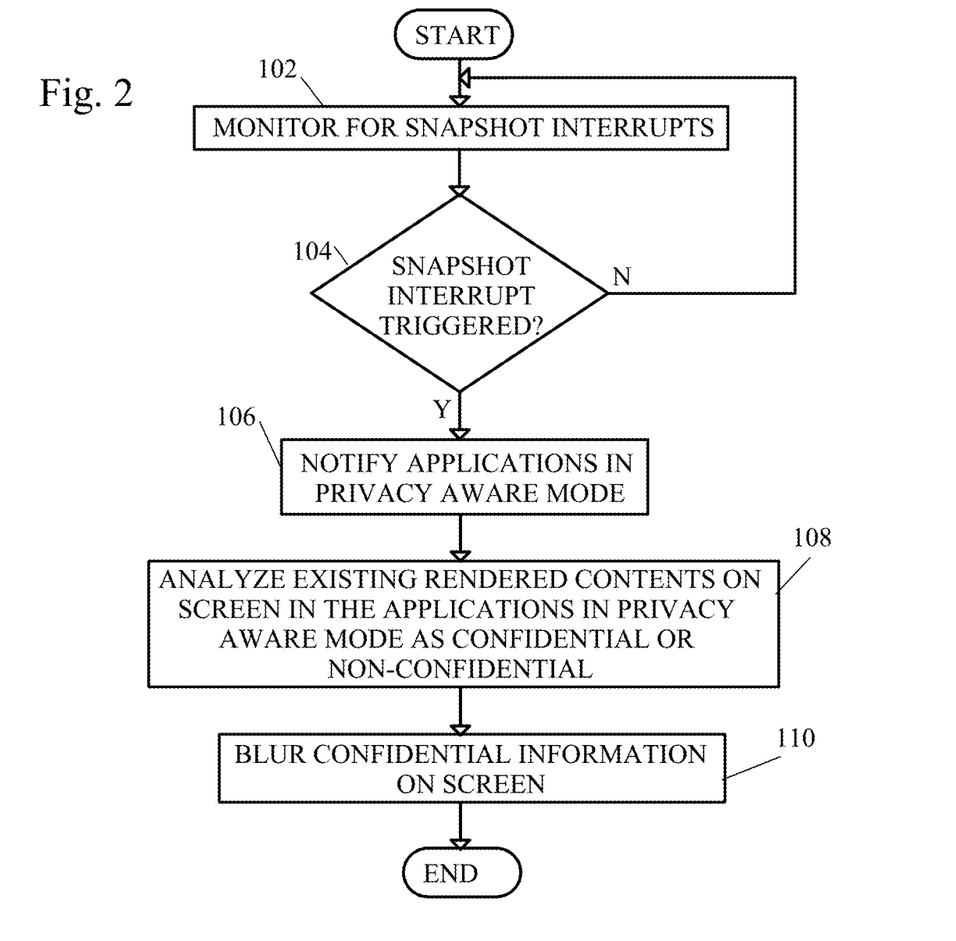
FIG. 2 shows a flow diagram of a method of preventing snapshot data leaks on a device computer.

FIG. 2 shows a flow diagram of a method of preventing snapshot data leaks on a second device computer 56 which has received data from a first device computer 52. The owner of the data, through the first device computer 52, is able to dictate the privacy policies relating to data captured (via a snapshot) when the data is displayed or sent to the receiver (second device computer 56) via a snapshot interrupt program 66 of the first device computer 52 and associated with the application displaying the information.

For example, the user or owner of the data may set a policy that blurs or masks all confidential data in a snapshot if a snapshot is triggered by the receiver through the second device computer 56. The snapshot interrupt program 66 is activated when an application of a first device computer 56 is placed in privacy aware mode and the information is displayed on the second device computer 56. In other words, the application on the second device computer 56 and displaying the information from the first device computer 52 receives the policy associated with the data with the transfer or data being sent to the second device computer 56 and the application on the second device computer 56 which is displaying the information executes the policy, for example through the snapshot interrupt program 66 of the first device computer 52. The method described below occurs after data has been shared between the first device computer 52 and the second device computer 56.

The snapshot interrupt program 66 of the first device computer 52 monitors for snapshot interrupts on the second device computer (step 102), for example through the application on the second device computer 56 which is displaying the information from the first device computer 52.

The snapshot interrupts which are monitored may include, but are not limited to "Pressing print screen in windows", receiving an input of "Command+Shift+3" dependent keyboard shortcuts, or other application program interface (API) interrupts. These interrupts can be collected through crowd sourcing or stored in a repository, such as repository 53 of FIG. 1. The interrupts may be associated or registered with specific events, such as events associated or registered for taking snapshots. Alternatively, instead of monitoring for the snapshot interrupts, specific events can be monitored for continuously.

If a snapshot interrupt is not triggered on the second device computer (step 104), the method returns to step 102.

When a snapshot interrupt is triggered on the second device computer (step 104), applications in privacy aware mode are notified (step 106), for example by the snapshot interrupt program 66.

The snapshot interrupt program 66 analyzes existing rendered contents on the screen in the applications in privacy aware mode of the second device computer to determine whether the contents are confidential or non-confidential (step 108).

Confidential information shared between the first device computer 52 and the second device computer 56 may be implicitly tagged by the user supplying the confidential information. For example, the user may indicate that all text which is in italics, bold, or marked with specific characters at the beginning and end of specified information to be considered confidential. Furthermore, existing tools may also be used to auto-identify confidential data.

The snapshot interrupt program 66 from the first device computer 52 blurs confidential information within the rendered contents on the screen (step 110), such that the snapshot captures blurred contents, thereby preventing the confidential data designated by the user of the first device computer to be leaked in a snapshot image and the method ends. It should be noted that only the confidential information rendered on the screen is blurred and that the blurring only occurs once a snapshot interrupt is received by the receiver of the confidential information.

The confidential information may be blurred by image processing and convolving the image of the data with a Gaussian function, resulting in a Gaussian blur or smoothing. Other blurring effects or masking may also be used to hide the confidential information or prevent the confidential information from displaying in a readable manner to a user on the receiving end of the information. For example, symbols can be placed over the confidential information blocking or preventing all readability of the confidential information when captured by a snapshot of the second device computer 56.

Figure 3A:
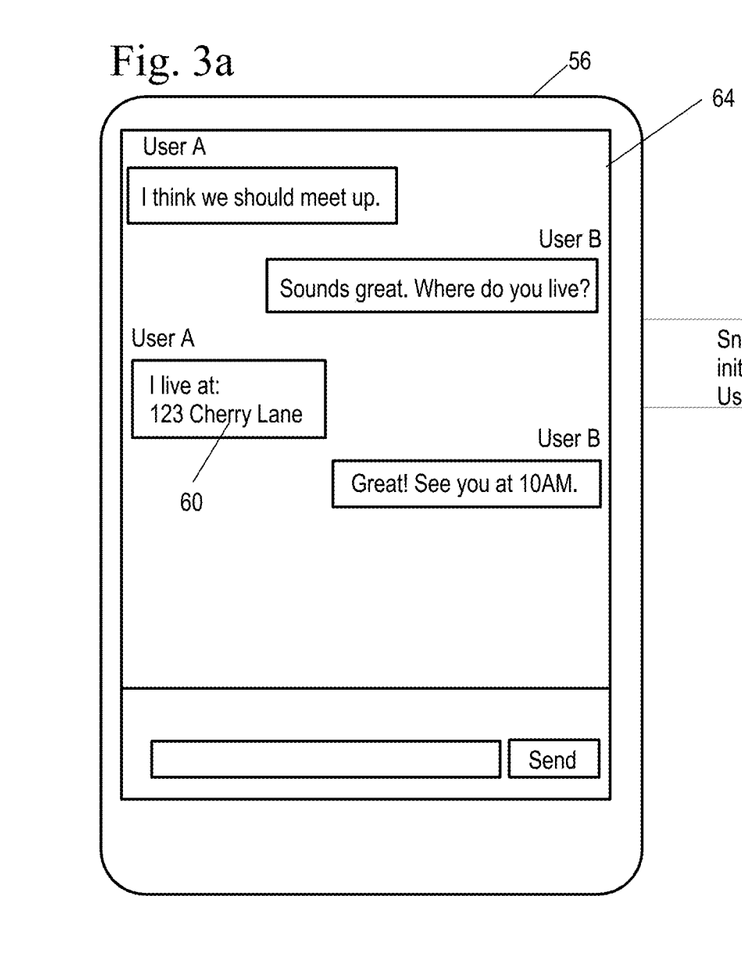
FIG. 3a shows an example of contents displayed on a second device computer in privacy aware mode.
Figure 3B:
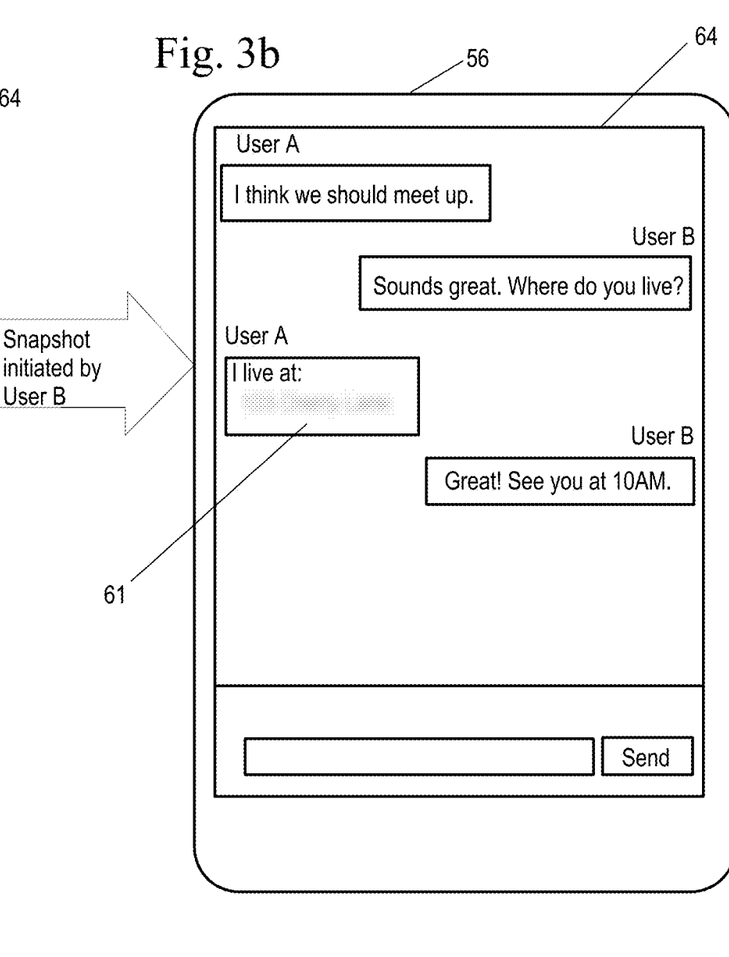
FIG. 3b shows an example of contents displayed on a second device computer in privacy aware mode after a snapshot has been initiated on the second device computer to capture confidential information.

For example, and referring to FIGS. 3*a*-3*b*, a first user, User A of a first device computer is conversing with a second user, User B, of a second device computer 56 through an application. User A can control what of the data shared during the conversation can be captured clearly in a snapshot by User B through the second device computer 56.

If User A provides User B with information in which User A wishes to keep private, i.e. home address—123 Cherry Lane, User A can indicate that the information is private by encapsulating the information in italics or including a series of characters which are set to indicate the beginning and end of confidential information. Alternatively, the snapshot interrupt program 66 of the first device computer 52 may determine that the home address is confidential information based on User A settings.

Prior to a snapshot interrupt occurring, the confidential information 60 is readable by User B on a screen 64 of the second device computer 56 through the same application used by User A.

If User B attempts to capture the home address information through a snapshot, or a snapshot is remotely triggered through the second device computer 56, the snapshot interrupt program 66 from the first device computer 52 analyzes the contents displayed on the screen 64 of the second device computer 56 of User B and blurs only the confidential information 61 of the home address in the snapshot as shown in FIG. 3*b*.

Therefore, the snapshot interrupt program 66 allows the user sharing information (User A) to control what data can be copied through a snapshot by the device on which the data is being displayed, on a receiving end (User B).

It should be noted that while the application being used by User A and User B in the above example is the same application, different applications for reading the same file types may be used by User A and User B, and the snapshot interrupt program 66 can be associated with the information itself and how it is viewed by an application on the second device computer 56.

FIG. 4 illustrates internal and external components of a first device computer 52, a second device computer 56, and server computer 54 in which illustrative embodiments may be implemented. In FIG. 4, a first device computer 52, a server computer 54, and a second device computer 56 include respective sets of internal components 800*a*, 800*b*, 800*c* and external components 900*a*, 900*b*, 900*c*. Each of the sets of internal components 800*a*, 800*b*, 800*c* includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and snapshot interrupt program 66 are stored on one or more of the computer-readable tangible storage devices 830 for execution by one or more of the processors 820 via one or more of the RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800*a*, 800*b*, 800*c* also includes a R/W drive or interface 832 to read from and write to one or more portable computer-readable tangible storage devices 936 such as a CD-ROM, DVD, memory stick, magnetic tape, magnetic disk, optical disk or semiconductor storage device. Snapshot interrupt program 66 can be stored on one or more of the portable computer-readable tangible storage devices 936, read via R/W drive or interface 832 and loaded into hard drive 830.

Each set of internal components 800a, 800b, 800c also includes a network adapter or interface 836 such as a TCP/IP adapter card. Snapshot interrupt program 66 can be downloaded to the first device computer 52, a second device computer 56, and server computer 54 from an external computer via a network (for example, the Internet, a local area network or other, wide area network) and network adapter or interface 836. From the network adapter or interface 836, snapshot interrupt program 66 is loaded into hard drive 830. Snapshot interrupt program 66 can be downloaded to the server computer 54 from an external computer via a network (for example, the Internet, a local area network or other, wide area network) and network adapter or interface 836. From the network adapter or interface 836, snapshot interrupt program 66 is loaded into hard drive 830. The network may comprise copper wires, optical fibers, wireless transmission, routers, firewalls, switches, gateway computers and/or edge servers.

Each of the sets of external components 900a, 900b, 900c includes a computer display monitor 920, a keyboard 930, and a computer mouse 934. Each of the sets of internal components 800a, 800b, 800c also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Snapshot interrupt program 66 can be written in various programming languages including low-level, high-level, object-oriented or non object-oriented languages. Alternatively, the functions of a snapshot interrupt program 66 can be implemented in whole or in part by computer circuits and other hardware (not shown).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of preventing snapshot data leaks of data confidential to a first user sent from a first device computer of a first application in a privacy mode of the first user to a second device computer displayed on a screen of the second device computer through a second application of the second device computer comprising the steps of:
   the first device computer monitoring for snapshots triggered on the second device computer through the second application on the second device computer displaying the data confidential to the first user and when a snapshot is triggered on the second device computer, the first device computer:
   notifying the applications in privacy mode;
   analyzing existing rendered contents displayed on the screen of the second device computer through the second application in privacy mode as confidential or non-confidential; and
   masking the confidential information displayed on the screen of the second device computer through the second application in privacy mode and masking the confidential information present within the snapshot triggered on the second device computer, wherein only the confidential information is selectively masked as a function of an alpha numeric input on the first device computer including a series of alpha numeric input characters that designate a beginning and an end of the confidential information displayed on the second device computer.

2. The method of claim 1, wherein the masking of confidential information is blurring.

3. The method of claim 1, wherein the masking prevents readability of the confidential information within the snapshot triggered.

4. The method of claim 1, wherein the masking is placement of symbols over the confidential material, making the confidential material present within the snapshot triggered unreadable.

5. The method of claim 1, wherein the snapshot interrupts are associated with specific events.

6. The method of claim 1, wherein the user of the first device computer provides input regarding the information designated as confidential.

7. The method of claim 1, wherein the application on the first device computer and the second device computer are the same.

8. A computer program product for preventing snapshot data leaks of data confidential to a first user sent from a first device computer of a first application in a privacy mode of the first user to a second device computer displayed on a screen of the second device computer through a second application of the second device computer, the first device computer and the second device computer comprising at least one processor, one or more memories, one or more computer readable storage media, the computer program product comprising a computer readable storage medium having program instructions embodied therewith, the program instructions executable by the computer to perform a method comprising:
   monitoring, by the first device computer, for snapshots triggered on the second device computer through the second application on the second device computer displaying the data confidential to the first user and when a snapshot is triggered on the second device computer:
   notifying, by the first device computer, the applications in privacy mode;
   analyzing, by the first device computer, existing rendered contents displayed on the screen of the second device computer through the second application in privacy mode as confidential or non-confidential; and
   masking, by the first device computer, the confidential information displayed on the screen of the second device computer through the second application in privacy mode and masking, by the first device computer, the confidential information present within the snapshot triggered on the second device computer, wherein only the confidential information is selectively masked as a function of an alpha numeric input on the first device computer including a series of alpha numeric input characters that designate a beginning and an end of the confidential information displayed on the second device computer.

9. The computer program product of claim 8, wherein the masking of confidential information is blurring.

10. The computer program product of claim 8, wherein the masking prevents readability of the confidential information within the snapshot triggered.

11. The computer program product of claim 8, wherein the masking is placement of symbols over the confidential material, making the confidential material present within the snapshot triggered unreadable.

12. The computer program product of claim 8, wherein the snapshot interrupts are associated with specific events.

13. The computer program product of claim 8, wherein the user of the first device computer provides input regarding the information designated as confidential.

14. A computer system for preventing snapshot data leaks of data confidential to a first user sent from a first device computer of a first application in a privacy mode of the first user to a second device computer displayed on a screen of the second device computer through a second application of the second device computer, the system comprising at least a first device computer and a second device computer, the first device computer and the second device computer each comprising at least one processor, one or more memories, one or more computer readable storage media having program instructions executable by the computer to perform the program instructions comprising:

monitoring, by the first device computer, for snapshots triggered on the second device computer through the second application on the second device computer displaying the data confidential to the first user and when a snapshot is triggered on the second device computer:

notifying, by the first device computer, the applications in privacy mode;

analyzing, by the first device computer, existing rendered contents displayed on the screen of the second device computer through the second application in privacy mode as confidential or non-confidential; and     masking, by the first device computer, the confidential information displayed on the screen of the second device computer through the second application in privacy mode and masking, by the first device computer, the confidential information present within the snapshot triggered on the second device computer, wherein only the confidential information is selectively masked as a function of an alpha numeric input on the first device computer including a series of alpha numeric input characters that designate a beginning and an end of the confidential information displayed on the second device computer.

15. The computer system of claim 14, wherein the masking of confidential information is blurring.

16. The computer system of claim 14, wherein the masking prevents readability of the confidential information within the snapshot triggered.

17. The computer system of claim 14, wherein the masking is placement of symbols over the confidential material, making the confidential material present within the snapshot triggered unreadable.

18. The computer system of claim 14, wherein the user of the first device computer provides input regarding the information designated as confidential.

\* \* \* \* \*